United States Patent [19]

Fethke et al.

[11] 4,402,714

[45] Sep. 6, 1983

[54] METHOD FOR RETARDING CORROSION IN MUFFLERS

[75] Inventors: Walter P. Fethke, Monroe, N.Y.; Stephen R. Dunne, Danbury, Conn.; Joseph P. Ausikaitis, White Plains, N.Y.

[73] Assignee: Union Carbide Corporation, Danbury, Conn.

[21] Appl. No.: 366,769

[22] Filed: Apr. 8, 1982

[51] Int. Cl.$^3$ .............................................. B01D 53/16
[52] U.S. Cl. ..................................... 55/35; 423/212; 55/75; 55/389; 60/311; 181/244
[58] Field of Search ................ 423/212, 213.2; 55/75, 55/DIG. 30, 29, 33, 35, 389; 60/311; 181/244, 256; 252/466

[56] References Cited

U.S. PATENT DOCUMENTS

| | | | |
|---|---|---|---|
| 2,984,315 | 5/1961 | Kleinecke | 55/DIG. 30 |
| 3,067,002 | 12/1962 | Reid, Jr. | 423/212 C |
| 3,109,510 | 11/1963 | Phelan | 181/244 |
| 3,477,826 | 11/1969 | Moyer et al. | 55/DIG. 30 |
| 3,740,347 | 6/1973 | Rosen et al. | 252/455 Z |
| 4,059,543 | 11/1977 | Kiovsky et al. | 252/455 Z |

FOREIGN PATENT DOCUMENTS

| | | | |
|---|---|---|---|
| 53-6639 | 3/1978 | Japan | 252/455 Z |
| 270541 | 5/1927 | United Kingdom | 423/212 |

*Primary Examiner*—Earl C. Thomas
*Attorney, Agent, or Firm*—Richard G. Miller

[57] ABSTRACT

A non-catalytic method for extending the life of the metal parts of an automobile muffler which comprises placing an adsorbent mass, preferably of crystalline zeolitic molecular sieve, in the internal space thereof, in sufficient amount to prevent condensation of water vapor from the engine exhaust gases on the walls thereof after engine shutdown. This procedure significantly inhibits corrosion of the metal parts.

7 Claims, No Drawings

METHOD FOR RETARDING CORROSION IN MUFFLERS

The present invention relates in general to the inhibition of corrosion in mufflers used in conjunction with internal combustion engines, and more particularly to improved zeolite-containing corrosion-resistant muffler systems suitable for use in vehicles such as automobiles and trucks which are powered by internal combustion engines.

Corrosion and resultant failure of mufflers is primarily due to two corrosion mechanisms. Stress corrosion is caused by vibration, applied stress, and chemical action without loss of metal. Failure is typified by cracking initiated by pitting. Cracking can occur near non-stress relieved welds and corrosion fatigue may result under dynamic or altering stress conditions in a corrosive environment. Chemical corrosion or general corrosion is caused by fairly uniform thinning and loss of metal not accompanied by localized action such as pitting and cracking. The corrosiveness of the environment can be decreased by reducing or changing temperature, pressure, velocity, and/or composition. In conventional automotive systems there is not a very great degree of freedom to significantly alter these parameters since the optimum performance of the internal combustion engine involved is far more critical than the life of the muffler system.

It has heretofore been proposed to utilize adsorbents such as crystalline zeolites in exhaust systems for internal combustion engines for the reduction of atmospheric pollutants in the exhaust gases. As such the zeolites' primary function is as a catalyst to alter the chemical composition of the effluent gas stream. Accordingly, the zeolites are not positioned within the muffler, but are contained within a separate enclosure commonly called a catalytic converter. Such a system is disclosed in U.S. Pat. No. 4,157,375, Brown et al. On the other hand, the adsorbent properties of crystalline zeolite catalysts have also been utilized in automotive exhaust systems as in U.S. Pat. No. 3,067,002 (Reid, Jr.) wherein natural or synthetic alkali or alkaline earth metal aluminosilicates are effective for sorbing uncombusted hydrocarbons. During engine warm-up periods hydrocarbons are first adsorbed and then are desorbed when the exhaust gas temperature and the catalyst become hot enough to fully combust these hydrocarbons. In order for an adsorbent to be effective for hydrocarbon adsorption, moisture would also have to be removed when using hydrophilic zeolites. A non-combustible hydrophobic (organophilic) adsorbent would be a preferred product in the Reid process. Krebs, et al. (U.S. Pat. No. 3,618,314) specify NaX molecularlsieve to be effective for filtering out carbonaceous particulate matter by incorporating the adsorbent in chambers or baffles.

It has now been discovered, however, that the adsorbent properties of crystalline zeolites, and activated alumina can be utilized in an essentially non-catalytic manner to alter the chemical composition of the corrosive environment periodically contained within a muffler section of an exhaust system, and thus significantly increase the life of the metal parts thereof in direct contact with the corrosive materials. In accordance with the present invention, the method for inhibiting the corrosion of metal parts of a muffler used in conjunction with an internal combustion engines comprises inserting in the internal space of said muffler an adsorbent mass selected from the group consisting of crystalline zeolitic molecular sieves, and activated alumina, said adsorbent mass being in contact with any gases entering said muffler from the internal combustion engine and the ambient atmosphere.

It is known that the corrosiveness of such an environment can be reduced by holding acid levels to a minimum and eliminating moisture. The effectiveness of any given corrosion inhibitor generally increases with an increase in concentration or quantity of the inhibitor. However, the amount and location of the inhibitor is also very critical because a deficiency or an improper location may cause a localized increase in the corrosive environment at some other location.

In an automobile muffler the typical exhaust gas composition is given in the table below:

| | |
|---|---|
| $N_2$ | 81 vol-% |
| $O_2$ | Trace |
| $H_2O$ | 10 vol-% |
| CO | Trace |
| $CO_2$ | 8.9 vol-% |
| $NO_x$ | 0.09 vol-% |
| $SO_x$ | 0.1 vol-% |

The typical muffler operating temperature is 700° to 800° F., with pressures slightly above atmospheric. When the engine is shut off the exhaust gases remain trapped in the exhaust system and condensation occurs as the muffler temperature fails to ambient. The condensate collects in the lower portions of the muffler and enhances the rate of corrosion in those areas. As the steam condenses, the mist also tends to scrub the exhaust gas, and the condensate contains trace acidic components such as carbonic acid, nitrous and nitric acid, sulfurous and sulfuric acid. These trace acids, in conjunction with the condensate, tend to accelerate the oxidation of the metal. Therefore, within the muffler there are ordinarily localized and harsh corrosive environments that may otherwise shorten the useful life of the muffler. It is the control of the moisture and acidity created during the idle engine hours by the use of an adsorbent which is the object of the present invention.

An automobile muffler has an internal volume of approximately 1000 to 2400 cubic inches. A typical moisture content of the exhaust gas is approximately 10 vol %. Assuming that the gas composition remains constant as the muffler cools to ambient temperature, 0.514 grams of water are stored in a 1000 cubic inch volume. This water, if not removed, will in part condense because the concentration is greater than the saturated water content of air at ambient temperatures. A small amount of zeolite adsorbent placed in strategic locations within the muffler is able to control this moisture and also adsorb and buffer any trace acidity that may be present.

For an adsorbent to be effective in this service it must satisfy a number of requirements, including resistance to liquid water, resistance to acid, hydrothermal stability, thermal stability, low coking potential, attrition resistance, adequate differential water capacity and acid capacity. In general crystalline zeolitic molecular sieves have all of the requisite properties, though not necessarily to the same degree. Hydrothermal stability is favored by higher zeolitic $SiO_2/Al_2O_3$ molar ratios. Also the more highly siliceous the zeolite, the more resistant it is toward acid degradation as a general rule. Water adsorptive capacity, however, tends to be inversely proportional to the $SiO_2/Al_2O_3$ ratio of any particular zeolite structure, due to a decrease in the electrical field created within the adsorption cavities by the decrease in $AlO_4$-tetrahedra. Above $SiO_2/Al_2O_3$ molar ratios or about 20, zeolites are sometimes called "hydrophobic" because of their tendency to adsorb non-polar molecules in preference to such highly polar molecular species as water. Accordingly, while any crystalline zeolitic molecular sieve which has pores of sufficient diameter to adsorb water, i.e. at least about 3 Angstroms, can be used in the present invention, it is preferred that the zeolite has a surface area of at least 350 $m^2/g.$, a pore diameter of at least 3.2 Angstroms, a molar $SiO_3/Al_2O_3$ ratio of from 4 to 20 and a water adsorption capacity at 100° C. and water vapor pressure of 80 mm.Hg of at least 4 weight percent based on the anhydrous weight of the zeolite. Specific zeolites within this class include both naturally-occurring and synthisized zeolites such as mordenite, chabazite, erionite, clinoptilolite, zeolite Y (including the various stabilized forms thereof such as Z 14-US) zeolite omega, ZSM-5, ZSM-11, ZSM-12, zeolite beta, zeolite T, and zeolite L.

Activated alumina, the other adsorbent which can be employed in reducing muffler corrosion, is essentially a porous, granular, amorphous aluminum oxide prepared from alumina trihydrate. It has a marked preferential affinity for water and is easily capable of drying gases to low dew points at atmospheric pressure. The surface area of the commercially available alumina desiccants is well above 350 $m^2/g.$, and under favorable conditions they have a capacity for water adsorption of about 10 wt.% before drying efficiency begins to fall.

In order for an adsorbent mass to be effective in reducing corrosion, it must have sustained capacity to adsorb water. Since the quantity f adsorbent mass must remain finite, a process to regenerate the adsorbent mass is required. When positioned within an automobile muffler, the differential (working) capacity for water of the adsorbent mass is achieved because the mass is regenerated "in situ" by the changing conditions. Regeneration (desorption) is achieved as the engine is running and the exhaust gases increase rapidly while the temperature while the temperature of the metal exhaust system increases slowly because of the thermal sink. Thus a preferred location for an adsorbent mass for regeneration would be in the proximity of the hot exhaust gas and not in a remote position such that the adsorbent mass would behave like a thermal sink. Although the water content of the exhaust gas is high (10 volume percent), the relative saturation of this gas at 600° to 800° F. is low and the adsorbent mass has a low equilibrium water loading; therefore, desorption must occur. Desorbing water is swept out of the exhaust system by the following exhaust gases. Adsorption occurs when the engine is shut off and the flow of exhaust gas stops and the entire exhaust system begins to cool to ambient temperatures. As the exhaust gas cools, the relative saturation of the gas increases for constant water content (dew point) and the adsorbent mass will have a higher equilibrium loading. Because the adsorbent mass can be considered an insulator compared to the metal walls of the muffler, this places specific demands on the adsorbent mass. The adsorbent mass must adsorb water vapor before the metal cools below the dew point of the exhaust gas. An adsorbent with high water capacity at low relative water saturation contents and at high adsorbed temperatures is preferred. Accordingly, the quantity and type of adsorbent needed is that amount which prevents water condensation, at all times, within the muffler chamber. Useful differential water capacities for fresh zeolite and activated alumina at temperatures in the range of 100° F. nominal are about 4 to 25 weight percent. This represents a zeolite requirement of 2 to 13 grams for each 1000 cubic inch of muffler volume. Additional adsorbent is, of course, required to accommodate for aging and consequent reduction of its adsorption properties.

The manner of positioning the adsorbent in the muffler's internal space is not a factor critical to the present invention. It is of obvious importance that all of the internal space is in good communication with the adsorbent, and that the adsorbent remains in the muffler despite the tendency to be ejected by the force of the exhaust gases passing therethrough. A muffler generally consists of a singular external housing containing several internal chambers with interconnecting pipes. The chambers are created by means of internal metal bulkheads which position and support the internal piping network. Since the flow of exhaust gases is not necessarily constant, or even continuous, through all the chambers, it cannot be assumed that the exhaust gases are well mixed within a muffler. Therefore, it is preferred to distribute the adsorbent material among all the internal chambers of the muffler.

Independent containment devices such as tubes, pillows, bags and packets can be fabricated of thermally stable material, each device containing a small quantity (1 to 50 grams) of adsorbent. These devices can then be placed into each chamber during the manufacturing step. These devices could be loose or fixed into position be means of a clip or pop rivet without requiring any significant alteration of existing manufacturing procedures. Assembled mufflers can also be retrofitted with adsorbent by inserting these devices into at least two chambers via the exhaust and tail pipe connections.

Integral containment devices can also be used, but may require a change in existing designs and manufacturing procedures. These devices can consist of means for immobilizing the adsorbent in perforated metal boxes, between screens and bulkheads, or in expanded metal components. Adsorbent can also be sandwiched between the internal and external shells which constitute the external housing, with the internal shell having perforations to allow the adsorbent to contact the gas. Granular, extruded, beaded, or other monolithic forms of adsorbent are preferred to powder because of high local gas velocities which may fluidize the particles and carry them out of the muffler.

Coatings of tubes, bulkheads and/or internal surfaces with adsorbent is also feasible. Simulated coatings can be accomplished with an adsorbent loaded material or heat-resistant tape. Actual slip coatings made of silica-rich slurries of adsorbent powder can also be used to coat surfaces. Such a slurry can be used to dip, spray, or otherwise cover any surface. The coating is hardened by heating the part to about 200° C. either during production or on the vehicle.

The present invention and the improvements it provides are illustrated by the following example:

EXAMPLE 1

Four conventional six-passenger automobiles of the same brand and model were fitted with new mufflers which were offered commercially as replacement parts by the manufacturer of the automobiles for the originalequipment mufflers on these automobiles. Before installation, a trapdoor was placed on the bottom of each muffler to allow access to the interior of the central chamber. A carbon steel strip, which served as a corrosion specimen, was placed in each muffler, and in each of three of the four mufflers was placed a fine wire mesh bag containing 50 grams of extruded zeolite adsorbent pellets. The adsorbent and the test strip occupied the same chamber in the muffler. After the test muffler were resealed and installed, the test vehicles were operated in the normal manner of automobiles used as random personnel and small parcel carrier in conjunction with the operation of chemical manufacturing facility. Operated in this manner, each car was driven at intervals over a period of from 117 to 121 days and logged from 1,916 to 6,734 total miles on trips of varying distances. After a period of from 50 to 53 days, the mufflers were opened and their interior walls examined visually for signs of corrosion. The zeolite pellets were also examined in this manner and reinserted into the mufflers. The carbon steel corrosion specimens were prepared and cleaned before and after exposure in the mufflers, and their corrosion rate determined generally in accordance with the test procedures of ASTM-G1-67. To remove loose residue before and after exposure the test strips were scrubbed with a standard typewriter brush using a household cleanser. The specimens were also pickled before and after exposure in a 30% HCl solution inhibited with 0.5 weight-% alkyl pyridine. The corrosion rate was calculated in terms of mils thickness lost per year. After evaluation the same test strips were resealed in the mufflers along with the original zeolite samples, and the test procedure continued for an additional 66 to 68 days. The evaluation procedure was then repeated. The results are reported below. Test Period "X" indicated the first 50–53 day period and Test Period "Y" indicated the latter 66–68 day period.

The presence of the adsorbents was established to cause a significant reduction in the corrosion rate of the test strip. Additionally, the zeolites have retained their desired adsorption properties. It is clear, therefore, that the corrosive environment can be favorably altered for a finite period of time within the chamber of a muffler where adsorbent is located. Similar results are obtained using the activated alumina.

| Test Period | On Vehicle Time, Days | Vehicle No. | Miles Logged | Adsorbent Type | Test Strip Corrosion Rate (in./ yr.) |
|---|---|---|---|---|---|
| X | 53 | Control | 675 | None | 0.0034 |
| Y | 68 | " | 1958 | " | 0.0018 |
| (X + Y) | 121 | | 2633 | | 0.0025 |
| X | 50 | 1 | 1805 | Mordenite[1] | 0.0015 |
| Y | 68 | 1 | 3034 | " | 0.0027 |
| (X + Y) | 118 | | 4839 | | 0.0021 |
| X | 50 | 2 | 718 | Chabazite[2] | 0.0004 |
| Y | 67 | 2 | 1198 | " | 0.0016 |
| (X + Y) | 117 | | 1916 | | 0.00105 |
| X | 51 | 3 | 2309 | Zeolite Y[3] | 0.0009 |
| Y | 66 | 3 | 4425 | " | 0.0010 |
| (X + Y) | 117 | | 6734 | | 0.00095 |

[1] A mineral zeolite principally having the mordenite crystal structure.
[2] A mineral zeolite predominately chabazite, but also containing erionite and clinoptilolite.
[3] The sodium cation form of zeolite Y having a $SiO_2/Al_2O_3$ ratio of about 5.

What is claimed is:

1. Method for inhibiting the corrosion of metal parts of a muffler used in conjunction with an internal combustion engine which comprises inserting in the internal space of said muffler an adsorbent mass selected from the group consisting of crystalline zeolite molecular sieves and activated alumina, said adsorbent mass being in contact with any gases entering said muffler from the internal combustion engine and the ambient atmosphere, said adsorbent mass having a sufficient capacity for the adsorption of water vapor and being present in sufficient amount to prevent condensation of water vapor within the muffler chamber.

2. Method according to claim 1 wherein the adsorbent is employed in an amount of from about 2 to about 13 grams per 1,000 cubic inches of internal muffler void space.

3. Method according to claim 2 wherein the adsorbent comprises a crystalline zeolitic molecular sieve.

4. Method according to claim 3 wherein the adsorbent comprises a crystalline zeolite having a pore diameter of at least 3.2 Angstroms, a $SiO_2/Al_2O_3$ molar ratio of from 4 to 20 and having a water adsorptive capacity at 100° C. and a water vapor pressure of 80 mm.Hg of at least 4 weight percent based on the anhydrous weight of the zeolite.

5. Method according to claim 4 wherein the zeolite has the mordenite crystal structure.

6. Method according to claim 4 wherein the zeolite has the zeolite Y crystal structure.

7. Method according to claim 4 wherein the zeolite has the crystal structure of chabazite.

* * * * *